(12) United States Patent
Shibahara et al.

(10) Patent No.: US 6,870,587 B2
(45) Date of Patent: Mar. 22, 2005

(54) LIQUID CRYSTAL DISPLAY DEVICE HAVING A BLACK MATRIX WITH A SPECIFIC RESISTANCE

(75) Inventors: Hideo Shibahara, Tokyo (JP); Kimikazu Matsumoto, Tokyo (JP)

(73) Assignee: NEC LCD Technologies, Ltd., Kanagawa (JP)

(*) Notice: Subject to any disclaimer, the term of this patent is extended or adjusted under 35 U.S.C. 154(b) by 169 days.

(21) Appl. No.: 09/859,484

(22) Filed: May 18, 2001

(65) Prior Publication Data

US 2001/0043303 A1 Nov. 22, 2001

(30) Foreign Application Priority Data

May 18, 2000 (JP) ........................................ 2000-146883

(51) Int. Cl.[7] .................... G02F 1/1333; G02F 1/1335; G02F 1/1343
(52) U.S. Cl. .................. 349/141; 349/110; 349/106
(58) Field of Search ................ 349/141, 106, 349/110, 111; 345/80, 90, 96

(56) References Cited

U.S. PATENT DOCUMENTS

| | | | | | |
|---|---|---|---|---|---|
| 5,718,992 | A | * | 2/1998 | Sato et al. | 430/7 |
| 5,959,708 | A | * | 9/1999 | Lee et al. | 349/143 |
| 6,124,910 | A | * | 9/2000 | Nishida et al. | 349/110 |
| 6,281,953 | B1 | * | 8/2001 | Lee et al. | 349/43 |
| 6,335,772 | B1 | * | 1/2002 | Sato et al. | 349/44 |
| 6,411,360 | B1 | * | 6/2002 | Matsuyama et al. | 349/156 |
| 6,429,916 | B1 | * | 8/2002 | Nakata et al. | 349/106 |
| 6,429,918 | B1 | * | 8/2002 | Choi et al. | 349/11 |
| 6,515,729 | B1 | * | 2/2003 | Hoshino | 349/158 |
| 6,529,181 | B2 | * | 3/2003 | Nakano et al. | 345/98 |
| 2003/0043105 | A1 | * | 3/2003 | Hirakata | 345/96 |

FOREIGN PATENT DOCUMENTS

| | | | |
|---|---|---|---|
| JP | 5-249436 | * | 9/1993 |
| JP | 10-319436 | | 12/1998 |
| JP | 11-002841 | | 1/1999 |
| JP | 11-344725 | | 12/1999 |

* cited by examiner

Primary Examiner—Tarifur R. Chowdhury
Assistant Examiner—Mike Qi
(74) Attorney, Agent, or Firm—Young & Thompson

(57) ABSTRACT

A first substrate, a second substrate opposing to the first substrate, and liquid crystal provided in a space between the first substrate and second substrate are provided to an IPS mode liquid crystal display. A plurality of gate lines and a plurality of drain lines, thin film transistors, pixel electrodes, and common electrodes are formed on a transparent substrate in a first substrate. Each of the thin film transistors is provided in a vicinity of the intersection of the gate line and drain line. Each of the pixel electrodes is formed within a pixel region enclosed with an adjacent pair of the gate lines and an adjacent pair of the drain lines. Each of the common electrodes develops an electric field within each of the pixel regions between the pixel electrode and itself. The second substrate includes color layers provided for each of the pixel regions. The color layers are spaced apart from the gate lines and drain lines when seen on a plane.

5 Claims, 12 Drawing Sheets

LIQUID CRYSTAL DISPLAY DEVICE HAVING A BLACK MATRIX WITH A SPECIFIC RESISTANCE

BACKGROUND OF THE INVENTION

1. Field of the Invention

The present invention relates to an IPS (In-Plane Switching) mode liquid crystal display which rotates liquid crystal in a plane substantially parallel to a TFT substrate by applying a voltage across a pixel electrode and a common electrode formed in the TFT substrate, and more particularly to a liquid crystal display achieving enhanced contrast.

2. Description of the Related Art

In an active matrix type liquid crystal display, for example, thin film transistors (TFTs) are employed as pixel switching elements. Also, the active matrix type liquid crystal display attains a satisfactory image quality. For this reason, the active matrix type liquid crystal display is employed extensively as a monitor of a space-saving type desktop computer or the like. Generally, a liquid crystal display includes two operating modes: the twisted nematic (TN) mode, by which directors of aligned liquid crystal molecules are rotated in a direction perpendicular to the glass substrate, and the IPS mode, by which the directors are rotated in a direction parallel to the glass substrate.

In the IPS mode liquid crystal display, pixel electrodes and common electrodes, both having comb-teeth-wise portions extending parallel to each other, are formed on a transparent substrate for a TFT substrate. The TFT substrate is provided with TFTs. When a voltage is applied across the pixel electrode and common electrode, an electric field parallel to the substrate surface is developed. As a result, the orientation of the directors of the liquid crystal changes. A quantity of transmitting light is controlled by changing the orientation of the directors in this manner.

On the other hand, in case of the TN mode liquid crystal display, the directors of the liquid crystal may fall outside of the substrate surface and stand up. In such a case, a relation between a quantity of transmitting light and an applied voltage differs significantly when seen from the direction of the directors and from the normal direction of the substrate.

In the IPS mode liquid crystal display, as has been discussed, the directors rotate within plane of the substrate, and therefore, the above inconvenience does not occur. Hence, with the IPS mode liquid crystal display, a satisfactory image can be obtained in a very wide viewing angle.

The following description will describe behaviors of the liquid crystal molecules in the IPS mode with reference to FIG. 1 and FIGS. 2A and 2B. FIG. 1 is a view showing a relation of the orientation direction of the liquid crystal molecules between a pixel electrode 3 and a common electrode 2 versus an axis of polarized transmission. FIG. 2A is a view showing the orientation direction of the liquid crystal molecules in a dark state, and FIG. 2B is a view showing the orientation direction of the liquid crystal molecules in a light state.

In the IPS mode liquid crystal display, the liquid crystal is sandwiched by two polarizing plates having their respective axes of polarization intersecting at right angles, and as shown in FIG. 1 and FIGS. 2A and 2B, the liquid crystal is oriented homogeneously. The axis of polarization of one of the polarizing plates and the orientation direction of a liquid crystal molecule 10a are the same. Hence, black is displayed when no voltage is applied. Also, when a voltage across the pixel electrode 3 and common electrode 2 is applied, the liquid crystal molecule 10a is changed to twist toward the electric field, thereby displaying white. For this reason, the IPS mode liquid crystal display can lower luminance at displaying black in a stable manner.

In the conventional IPS mode liquid crystal display, however, the electric field is applied in the lateral direction, and therefore, transparent electrodes are not formed on the liquid crystal layer side of a color filter substrate (CF substrate) opposing the TFT substrate. For this reason, a color filter and a black matrix formed on the liquid crystal layer side of the CF substrate are not electrically isolated. Consequently, a charge distribution within the color filter is changed by an electric field applied to the liquid crystal, and an electric field is developed in the vertical direction, which disturbs the electric field in the lateral direction. Such disturbance of the electric field causes unwanted deterioration of the display quality, such as cross talks or image persistence.

Next, the following description will describe a change of the charge distribution within the color filter with reference to FIGS. 3 through 7. FIG. 3 is a plan view showing a constitution of a conventional IPS mode liquid crystal display. In the drawing, the layout of the electrodes and bus lines in the TFT substrate and the layout of the color filter in the CF substrate are superimposed. FIGS. 4 and 5 are cross sections taken along the lines A—A and B—B of FIG. 3, respectively. FIG. 6 is a view showing an equivalent circuit between a gate line and a pixel electrode. FIG. 7 is a view showing a correlation of the specific resistance of a black matrix versus luminance at displaying black in the conventional IPS mode liquid crystal display.

As shown in FIGS. 3 through 5, in the conventional IPS mode liquid crystal display, gate lines 6 and drain lines 5 intersecting substantially at right angles with each other are provided on a transparent substrate 1 for a TFT substrate 21, and a TFT 4 is provided to each intersection. Each pixel is provided with comb-teeth-wise pixel electrode 3 and common electrode 2. The pixel electrode 3 is connected to the TFT 4, and the common electrode 2 is connected to a common electrode line 2a that extends along the gate line 6. Further, a silicon nitride film 8 is formed to cover these electrodes. The longitudinal direction of the comb-teeth-wise portions of the pixel electrode 3 and common electrode 2 is substantially parallel to the drain lines 5. When a voltage is applied across the pixel electrode 3 and common electrode 2, an electric field is developed in a direction that intersects at substantially right angles with the longitudinal direction of the comb-teeth-wise portion and is substantially parallel to the surface of the transparent substrate 1.

A transparent substrate 14 for a CF substrate 22 is provided with a black matrix layer 13 for blocking incident light on the gate lines 6, drain lines 5, and a region between these lines and pixel display portions. Also, color layers 12 for color display, that is, three colors of RGB display, are formed on the transparent substrate 14. Further, an overcoat layer 11 is formed to cover the color layers 12.

An orientation film 9 is coated over the innermost surface of each of the TFT substrate 21 and CF substrate 22, and liquid crystal 10 is sandwiched between these substrates. The liquid crystal 10 is oriented homogeneously in a direction such that a predetermined angle is given with respect to the longitudinal direction of the pixel electrodes 3. A polarizing plate 15 is laminated to the outside of each substrate, and axes of polarization of the two polarizing plates 15 intersect at right angles with each other. The axis of polarization of one of the two polarizing plates 15 is set so as to be parallel to the orientation direction of the liquid crystal 10. All the common electrodes 2 are supplied with a constant common potential via the common electrode lines 2a. Each pixel electrode 3 is written with a potential from the drain line 5 through their respective TFTs 4. Consequently, an electric field is developed within the pixel, and the liquid crystal rotates with twisting, whereby the display is controlled.

In the conventional liquid crystal display, each color layer 12 is of a strip-wise shape connected to each other for a series of pixels provided in the extension direction of the drain lines 5 (the longitudinal direction in the drawing). For this reason, as shown in FIG. 5, each color layer 12 is formed to span the gate line 6 when seen from the normal direction of the substrate. Also, as shown in FIG. 4, the color layers 12 are separated above the drain lines 5, and parts of each color layer 12 overlap the drain line 5.

With the liquid crystal display arranged as above, the color layer 12 and black matrix layer 13 are in the electrically floating state, and capacitive-coupled to the gate lines 6, drain lines 5 and the like. Hence, when a signal voltage is applied on the gate line 6 or drain line 5, charges are injected into the color layer 12 and black matrix layer 13 at the portion overlapping the gate line 6 or drain line 5. Then, a vertical electric field is developed across the pixel electrode 3, and the color layer 12 and black matrix layer 13 as a potential of the color layer 12 and black matrix layer 13 changes. This disturbs the orientation of the liquid crystal molecules, and the luminance at displaying black is increased.

This phenomenon appears noticeably on the gate lines 6 having a larger voltage change. More specifically, in the conventional liquid crystal display, the color layers 12 are formed to cover the black matrix layer 13 above the gate lines 6. Thus, as shown in FIG. 6, the gate line 6 is connected to the pixel electrode 3 through a combined resistance of a parallel resistance, which includes a resistance R2 of the color layer 12 and a resistance R3 of the black matrix layer 13, and a resistance R1 of the liquid crystal 10. Therefore, in case that the color layer 12 or black matrix layer 13 has small resistance, a large volume of charges are injected into the color layer 12 or black matrix layer 13 from the gate lines 6, whereupon a large vertical electric field is developed across the color layer 12 and black matrix layer 13 and pixel electrode 3, which undesirably increases the luminance at displaying black remarkably. In general, a change in voltage on the gate line 6 is as large as ±20V approximately.

For example, FIG. 7 is a graph showing a relation of the specific resistance of the black matrix layer 13 versus luminance at displaying black. In general, the specific resistance of the color layer 12 is in the order of $10^{12}$ ($\Omega$·cm), which is larger than that of the black matrix layer 13. For this reason, the parallel resistance of these layers largely depends on the specific resistance of the black matrix layer 13. Hence, as shown in FIG. 7, if the specific resistance of the black matrix layer 13 drops to the order of $10^{11}$ to $10^{10}$ ($\Omega$·cm), the luminance at displaying black increases by a factor of approximately 7 from 0.5 (cd/cm$^2$) to 3.5 (cd/cm$^2$).

For example, contrast is used as an indicator representing the performance of the liquid crystal display, which is a ratio of the luminance at displaying black with respect to the luminance at displaying white. Because the luminance at displaying white changes little, the contrast largely depends on the luminance at displaying black. For instance, in the above-described case, the contrast is dropped to $\frac{1}{7}$. Hence, in order to enhance the contrast, it is important to lower the luminance at displaying black. In other words, it is important to reduce unwanted vertical electric fields developed across the color layer 12 and black matrix layer 13 and the pixel electrode 3 by reducing a quantity of charges injected into the color layer 12 and black matrix layer 13 by taking a countermeasure, such as using a high specific resistance material.

However, the specific resistance of the color layer 12 and black matrix layer 13 has an upper limit. Also, there is a problem that a range of material selection is narrowed if the specific resistance is increased. Therefore, there has been an increasing need for a liquid crystal display capable of reducing injected charges while securing a large tolerance for the specific resistance of the color layer 12 and black matrix layer 13.

SUMMARY OF THE INVENTION

It is therefore an object of the present invention to provide a liquid crystal display having a large tolerance for the specific resistance of the black matrix layer, and capable of enhancing contrast by controlling the development of a vertical electric field induced by charges injected into the color layer and black matrix layer.

According to one aspect of the present invention, a liquid crystal display comprises a first substrate, a second substrate opposing to the first substrate, and liquid crystal provided in a space between the first substrate and second substrate. The first substrate includes a transparent substrate, a plurality of gate lines and a plurality of drain lines formed on the transparent substrate, thin film transistors, pixel electrodes connected to the thin film transistor, and a common electrodes. Each of the pixel electrodes is formed within a pixel region enclosed with an adjacent pair of the gate lines and an adjacent pair of the drain lines. Each of the common electrodes develops en electric field within each of the pixel regions between the pixel electrode and itself. The second substrate includes color layers provided for each of the pixel region. The color layer are spaced apart from the gate lines and drain lines when seen the plane.

According to another aspect of the present invention, a liquid crystal display comprises a first substrate, a second substrate opposing to the first substrate, and liquid crystal provided in a space between the first substrate and second substrate. The first substrate includes a transparent substrate, a plurality of gate lines and a plurality of drain lines formed on the transparent substrate, thin film transistors, pixel electrodes, and common electrodes. Each of the thin film transistors is provided in a vicinity of the intersection of the gate line and drain line. Each of the pixel electrodes is formed within a pixel region enclosed with an adjacent pair of the gate lines and an adjacent pair of the drain lines, and connected to the thin film transistor. Each of the common electrodes develops an electric field within each of the pixel regions between the pixel electrode and itself. The second substrate includes color layers provided for each of the pixel regions. The color layers are spaced apart from the gate lines and overlapping the drain lines when seen on a plane.

According to the present invention, because the color layers are formed so as to be spaced apart from at least the gate lines, the color layers are unsusceptible to a change in voltage at least on the gate lines. Hence, when a voltage is applied to the gate lines, no charges are injected into the color layers by the applied voltage. For this reason, there will be developed no vertical electric field across the color layers and pixel electrodes such that disturbs the orientation of the liquid crystal molecules. In addition, in case that the color layers are formed apart from the drain lines also, the color layers are also unsusceptible to a change in voltage on the drain lines, and therefore, the orientation becomes more resistant to disturbance.

In addition, because no color layers are formed above the gate lines, an equivalent circuit in a space between the gate lines and pixel electrodes would be the resistance of the color layers, which have a large resistance value, and the resistance of the black matrix layer, which have a small resistance value in series. For this reason, even if the resistance of the black matrix layer drops, the luminance at displaying black does not rise noticeably. This makes it possible to secure a large margin for the selection of the black matrix materials.

Further, in case that the driving method by the dot inversion (pixel inversion) is adapted, even if the charges are injected into the color layers by a change in voltage on the drain lines, the charges injected into the color layers are cancelled out within each adjacent pair of the color layers. Consequently, it is possible to prevent the color layers from being charged over the entire display screen, thereby securing a large margin for the selection of the color layers materials.

DETAILED DESCRIPTION OF THE PREFERRED EMBODIMENT

Figure 1:
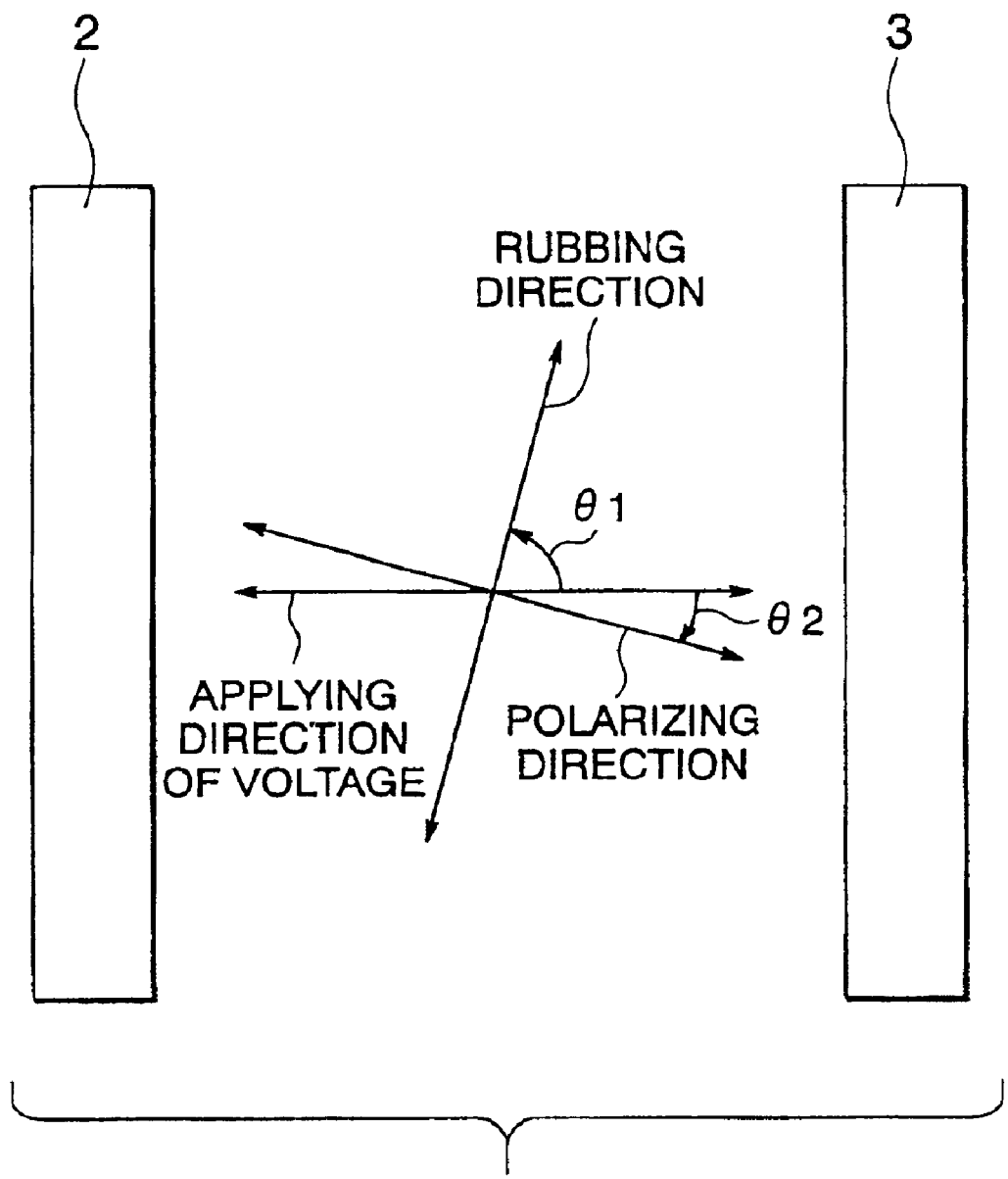
FIG. 1 is a view showing a relation of an orientation direction of liquid crystal molecules between a pixel electrode 3 and a common electrode 2 versus an axis of polarized transmission.
Figure 2A:
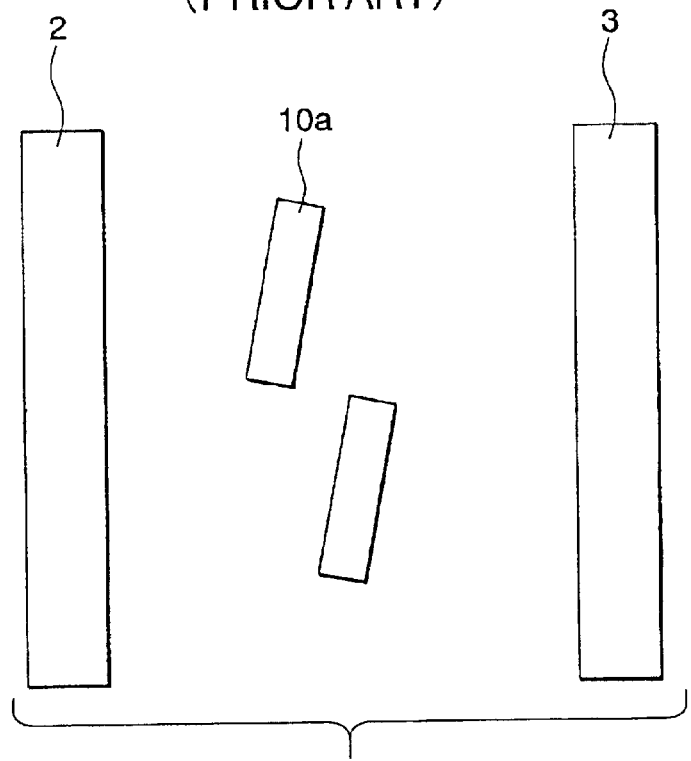
FIG. 2A is a view showing an orientation direction of the liquid crystal molecules in a dark state.
Figure 2B:
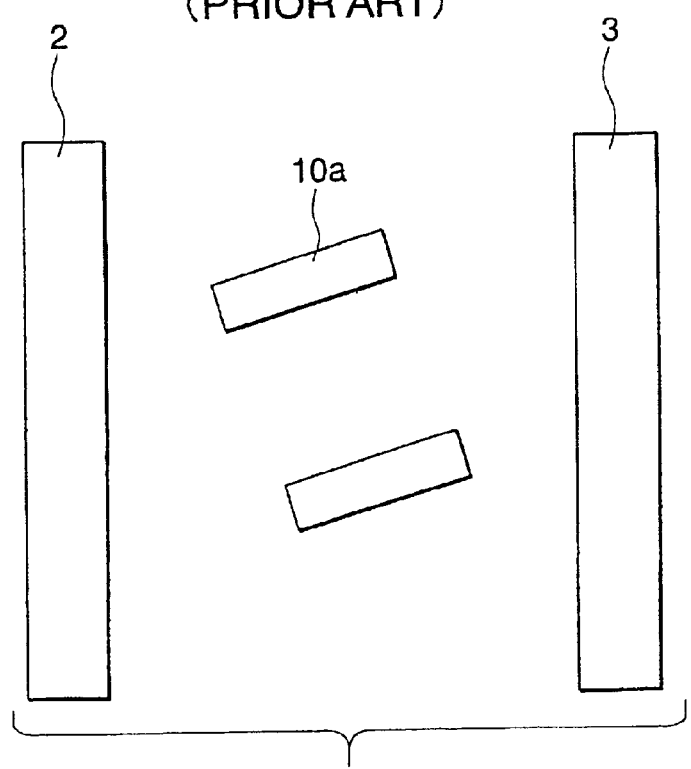
FIG. 2B shows an orientation direction of the liquid crystal molecules in a light state.
Figure 3:
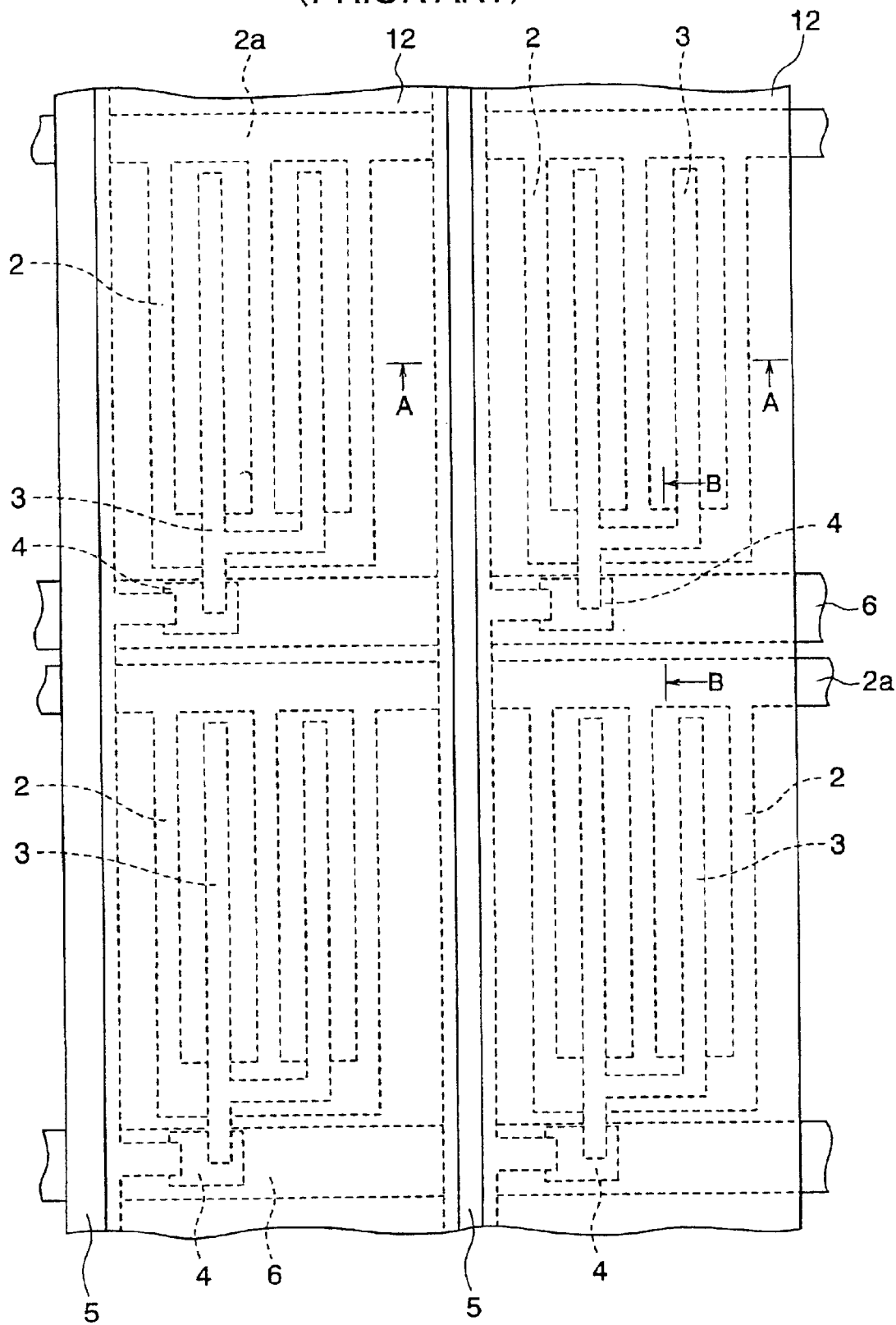
FIG. 3 is a plan view showing a constitution of a conventional IPS mode liquid crystal display.
Figure 4:
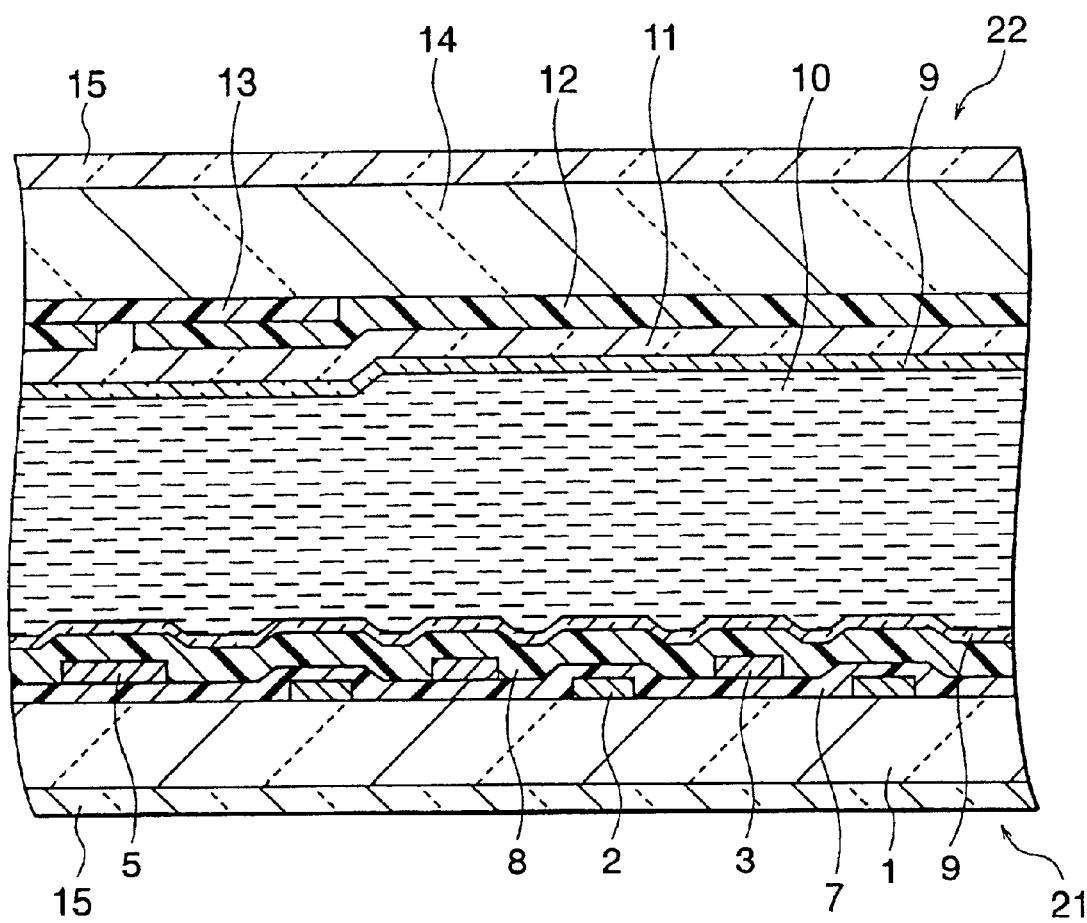
FIG. 4 is a cross section taken along the line A—A of FIG. 3.
Figure 5:
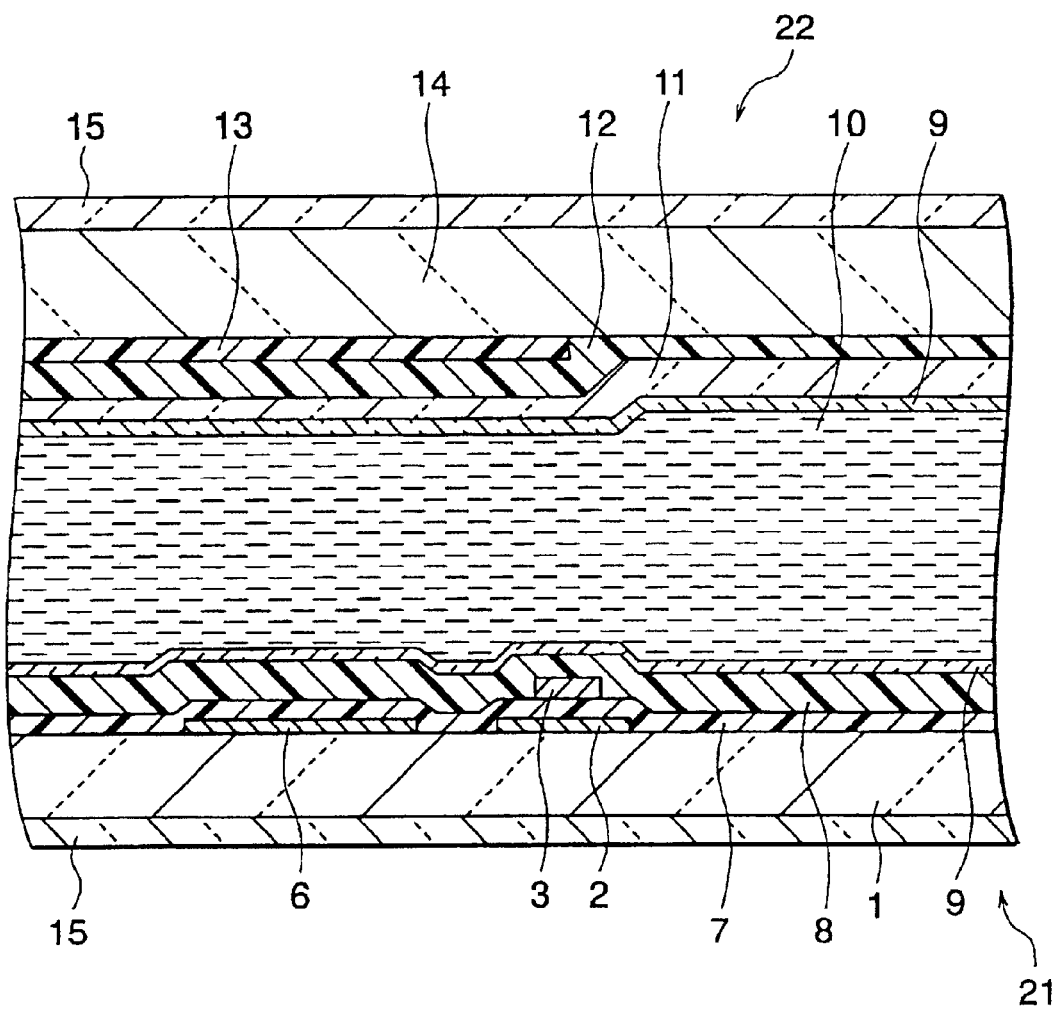
FIG. 5 is a cross section taken along the line B—B of FIG. 3.
Figure 6:
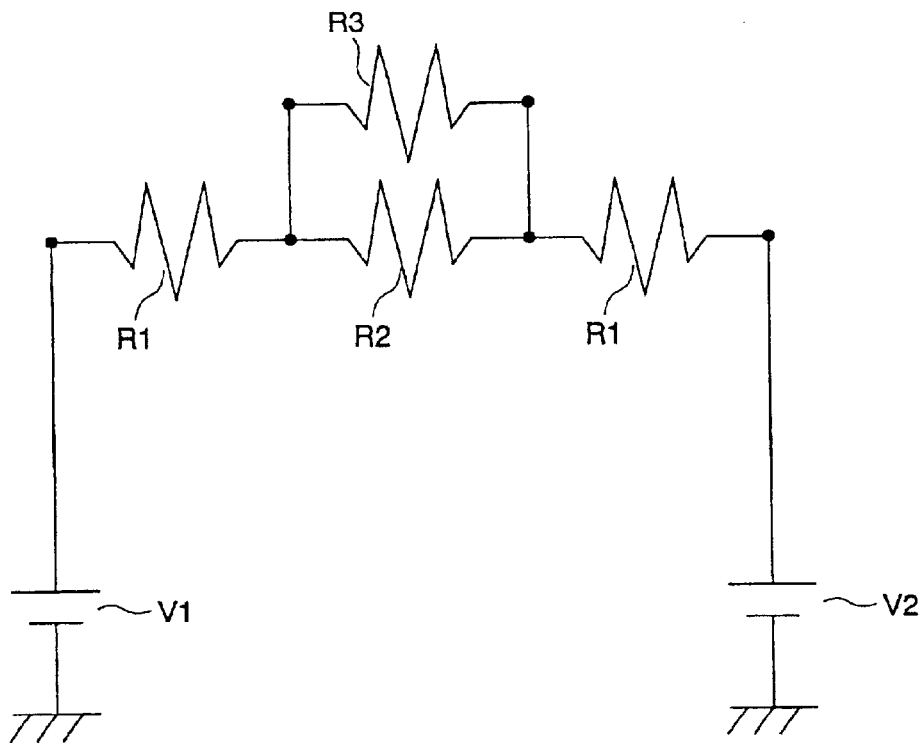
FIG. 6 is a view showing an equivalent circuit between a gate line and a pixel electrode.
Figure 7:
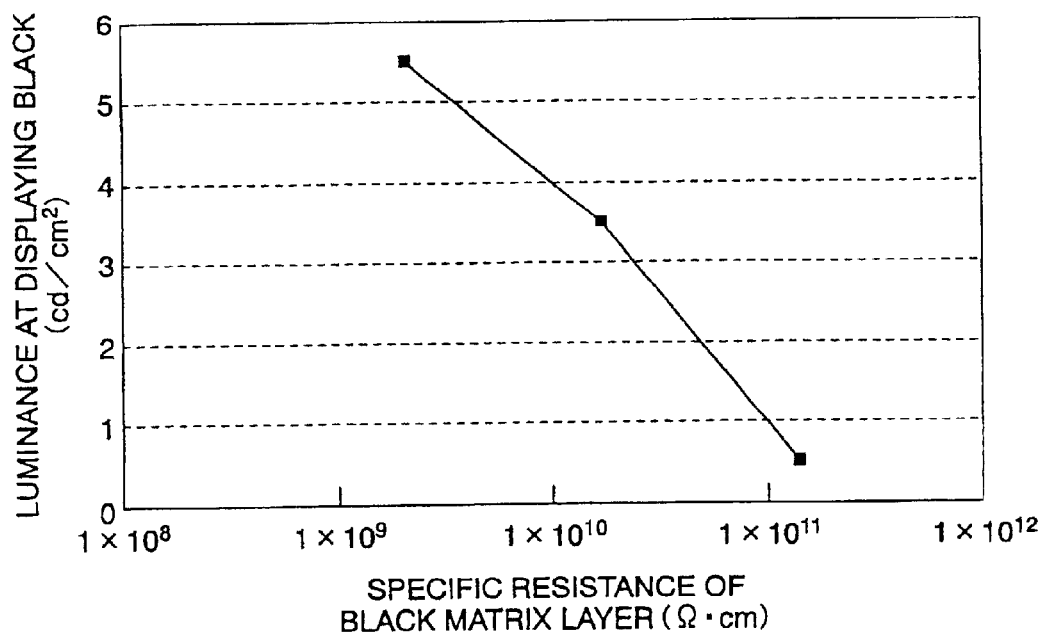
FIG. 7 is a view showing a correlation of specific resistance of a black matrix versus luminance at displaying black in the conventional IPS mode liquid crystal display.
Figure 8:
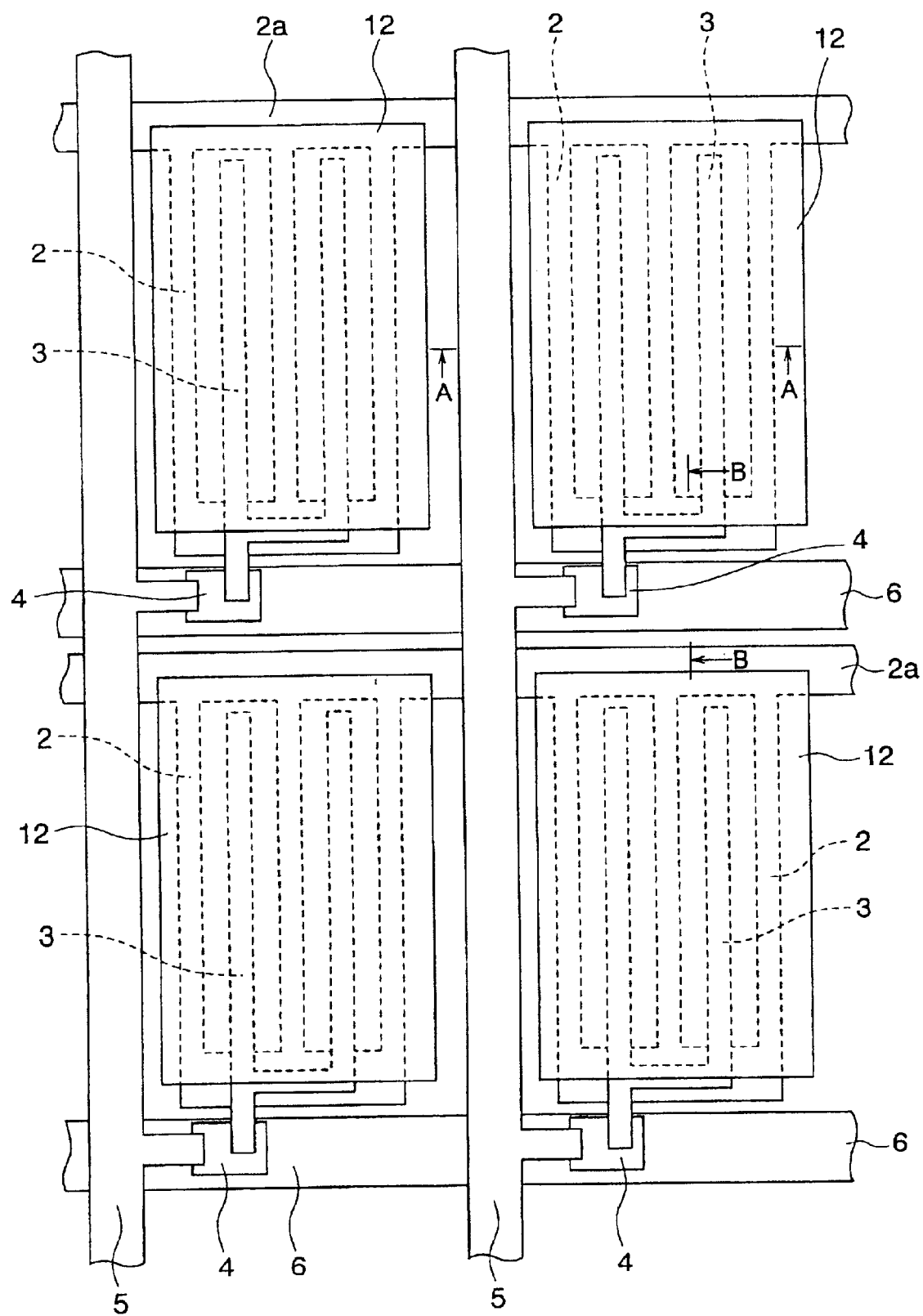
FIG. 8 is a plan view showing a constitution of a liquid crystal display in accordance with a first embodiment of the present invention.
Figure 9:
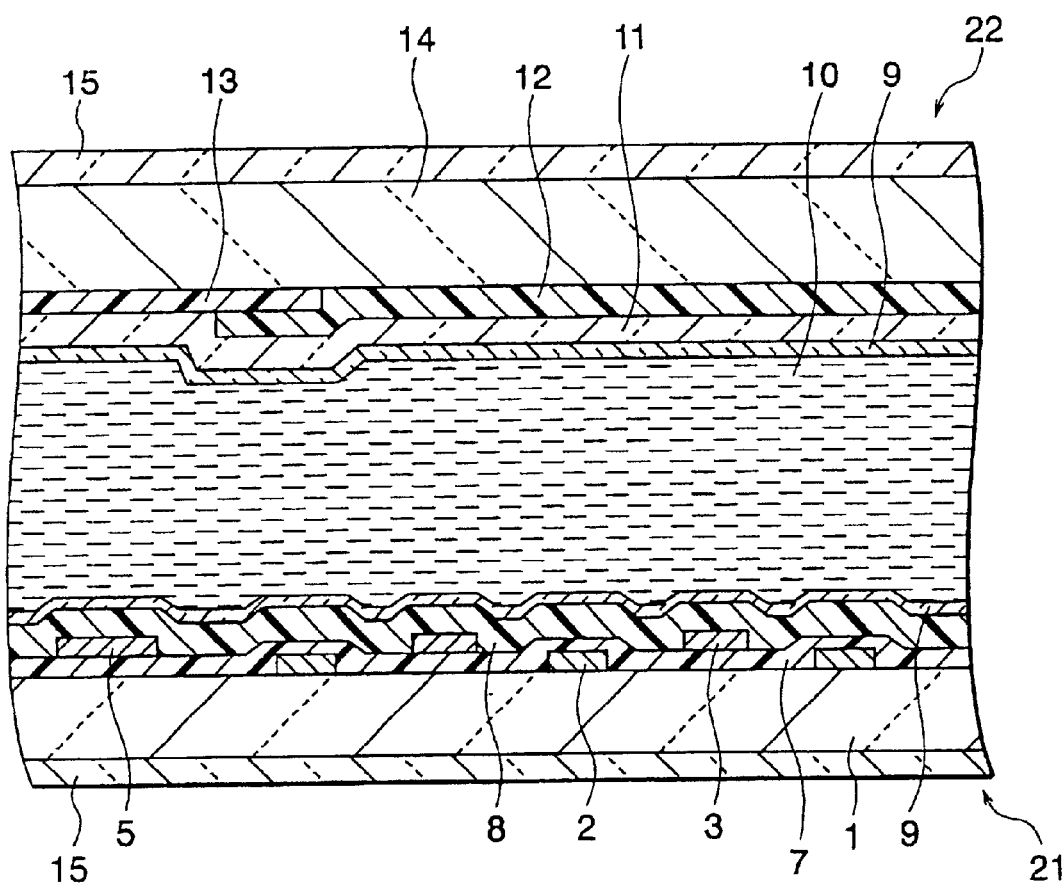
FIG. 9 is a cross section taken along the line A—A of FIG. 8.
Figure 10:
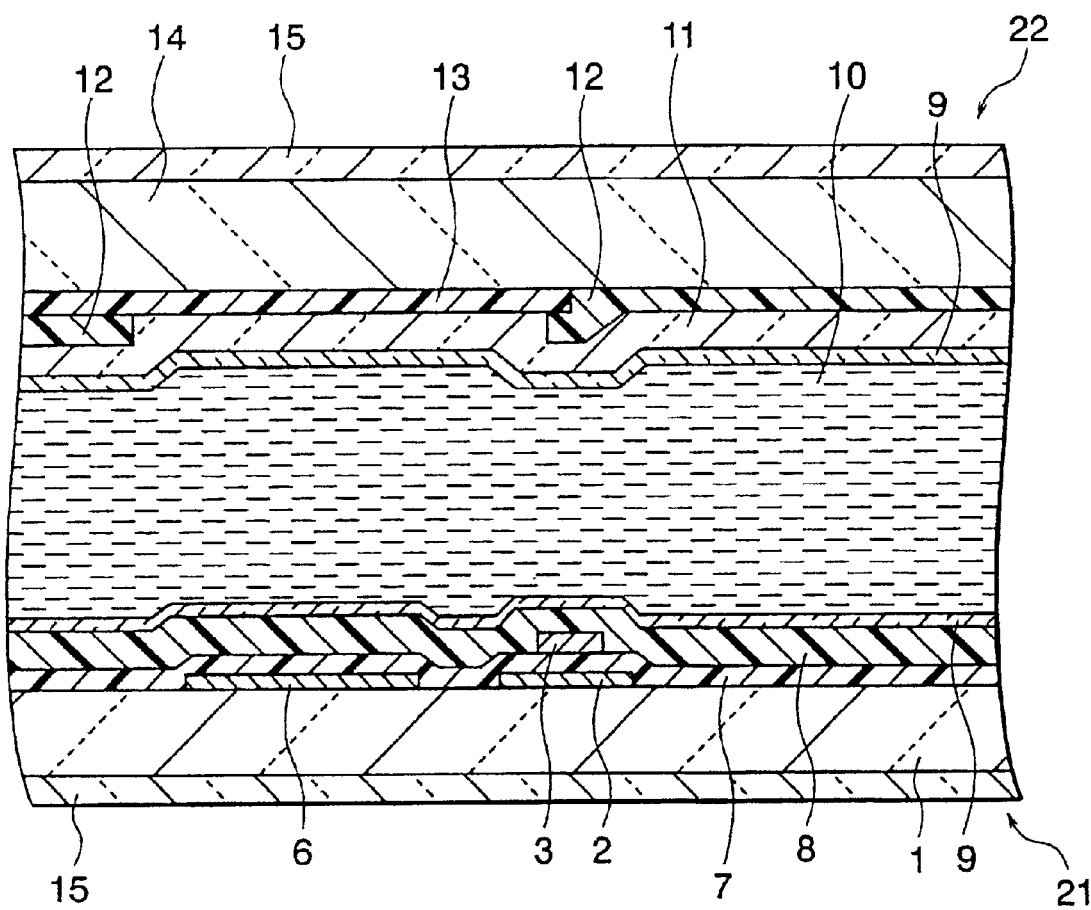
FIG. 10 is a cross section taken along the line B—B of FIG. 8.
Figure 11:
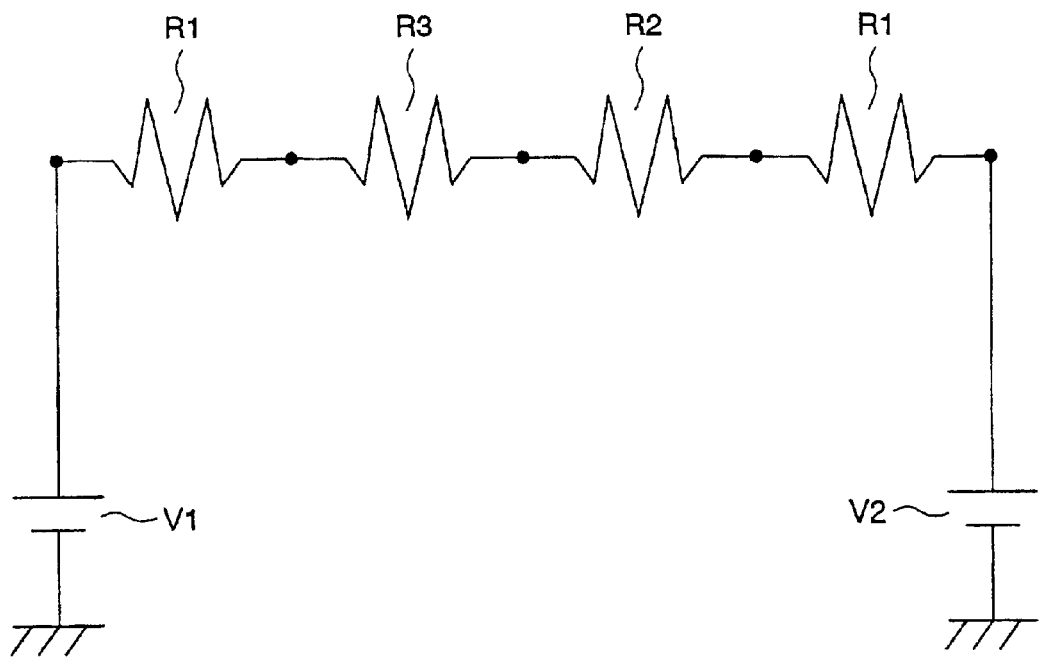
FIG. 11 is a view showing an equivalent circuit between a gate line and a pixel line in the first embodiment.
Figure 12:
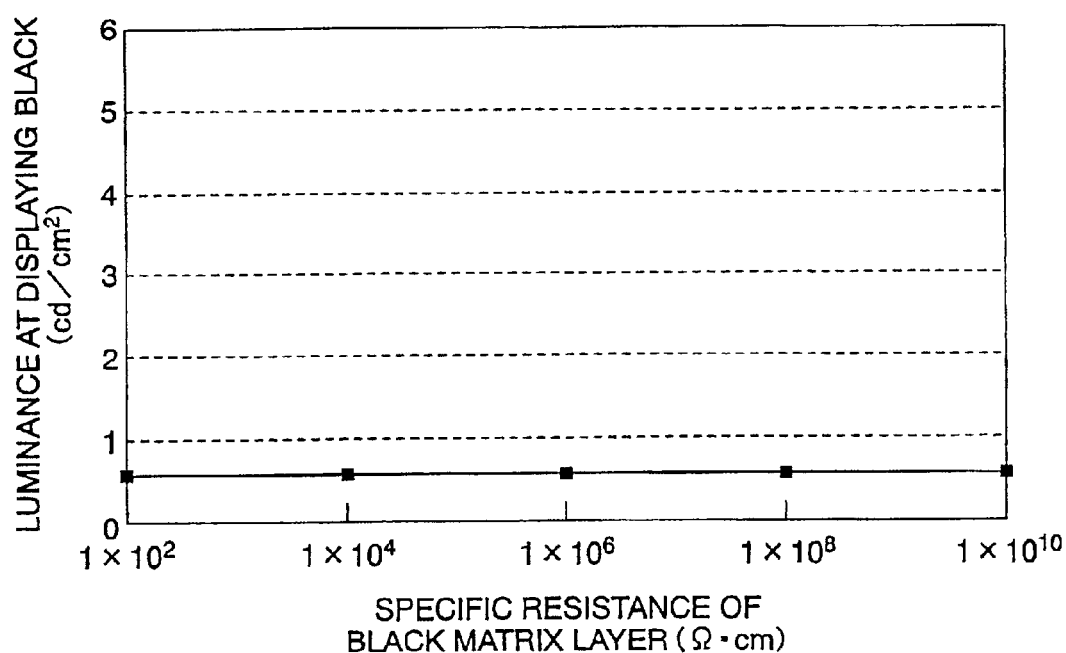
FIG. 12 is a view showing a correlation of specific resistance of a black matrix versus luminance at displaying black in the first embodiment.

The following description will describe preferred embodiments of the present invention in detail with reference to the accompanying drawings. FIG. 8 is a plan view showing a constitution of a liquid crystal display in accordance with a first embodiment of the present invention. In the drawing, the layout of electrodes and bus lines in the TFT substrate side and the layout of the color layer in the CF substrate side are superimposed. FIGS. 9 and 10 are cross sections taken along the lines A—A and B—B of FIG. 8, respectively. FIG. 11 is a view showing an equivalent circuit between a gate line and a pixel line in the first embodiment. FIG. 12 is a view showing a correlation of the specific resistance of a black matrix versus luminance at displaying black in the first embodiment.

In the first place, a manufacturing method of an IPS mode liquid crystal display in accordance with the first embodiment will be explained.

After a metal layer, which will be made into gate lines 6, common electrodes 2, and common electrode lines 2a, is deposited over a transparent substrate 1 for a TFT substrate 21, the metal layer is patterned into a predetermined shape. Then, a gate insulation film 7 is deposited on the metal layer, and an amorphous silicon film and an $n^+$ amorphous silicon film are deposited in succession. Then, the amorphous silicon film and $n^+$ amorphous silicon film are patterned into an island shape, thereby forming a TFT 4 region. Then, a contact region (not shown), in which a metal layer connected to the gate line 6 and common electrode line 2a is buried, is formed in a predetermined region in the gate insulation film 7. Then, a metal layer, which will be made into the drain line 5 and pixel electrode 3, is deposited and patterned into a predetermined shape. Then, a silicon nitride film 8 is deposited as a passivation film, and portions of the silicon nitride film 8 covering via hole regions of the drain line 5 and pixel electrode 3 are removed. With the fabrication sequence, the TFT substrate 21 is fabricated.

Also, a resin composition containing, for example, carbon particles, metal oxide, such as titanium oxide, metal sulfide, such as copper sulfide, a light screen, such as pigments of each kind, is deposited over a transparent substrate 14 for a CF substrate 22, and an opening is provided at each pixel region, whereby a black matrix layer 13 is formed. Further, a color layer 12 of the three colors of RGB is formed on the black matrix layer 13. Then, the color layer 12 is patterned in such a manner so as to be separated for each pixel and overlap the black matrix layer 13 at each end portion. Then, an overcoat layer 11 is formed to cover the color layers 12. With the fabrication sequence, the CF substrate 22 is fabricated.

Subsequently, an orientation film 9 is coated over the innermost surface of each of the TFT substrate 21 and CF substrate 22, and rubbing treatment is applied on each orientation film 9 in such a manner that a predetermined angle is given with respect to the longitudinal direction of the pixel electrode 3. Then, after a sealing member is coated and spacers are scattered, the substrates 21 and 22 are laminated to each other. Then, a space therebetween is filled with liquid crystal 10 and sealed. Further, polarizing plates 15 in the Cross Nicole state are laminated in such a manner so as to sandwich these substrates, whereby a liquid crystal display is fabricated.

The following description will describe a constitution of the liquid crystal display manufactured in the above manner with reference to FIGS. 8 through 10.

The gate lines 6 and drain lines 5 are formed on the transparent substrate 1 so as to intersect substantially at right angles with each other, and a matrix of TFTs 4 are provided at the intersections in a one-to-one correspondence. Each pixel is provided with comb-teeth-wise pixel electrode 3 and common electrode 2. The pixel electrode 3 is connected to the TFT 4, and the common electrode 2 is connected to the common electrode line 2a that extends along the gate line 6. Further, the silicon nitride film 8 is formed to cover these electrodes. The longitudinal direction of the comb-teeth-wise portions of the pixel electrode 3 and common electrode 2 is substantially parallel to the drain lines 5. When a voltage is applied across the pixel electrode 3 and common electrode 2, an electric field is developed in a direction that intersects at substantially right angles with the longitudinal direction of the comb-teeth-wise portions and is parallel to the surface of the substrate.

The transparent substrate 14 is provided with the black matrix layer 13 for blocking unwanted incident light on the gate lines 6, drain lines 5, and a region between these lines and pixel display portions. Also, the color layers 12 for color display, that is, three colors of RGB display, are formed on the transparent substrate 14. Further, the overcoat layer 11 is formed to cover the color layers 12.

With the conventional liquid crystal display, the black matrix layer 13 requires the specific resistance in the order of $10^{10}$ to $10^{11}$ ($\Omega \cdot cm$). However, as will be discussed below, with the liquid crystal display according to the present embodiment, a change of the specific resistance of the black matrix layer 13 hardly affects the luminance at displaying black, thereby making it possible to secure a large tolerance of the specific resistance for the black matrix layer 13.

The orientation film 9 is coated over the innermost surface of each of the TFT substrate 21 and CF substrate 22, and the liquid crystal 10 is sandwiched between these substrates. The liquid crystal 10 is oriented homogeneously in a direction such that a predetermined angle is given with respect to the longitudinal direction of the pixel electrodes 3. The polarizing plate 15 is laminated to the outside of each substrate, and axes of polarization of the two polarizing plates 15 intersect at right angles with each other. The axis of polarization of one of the two polarizing plates 15 is set so as to be parallel to the orientation direction of the liquid crystal 10. All the common electrodes 2 are applied with a constant common potential via the common electrode lines 2a. Each pixel electrode 3 is written with a potential from the drain line 5 via their respective TFTs 4. Consequently, a lateral electric field is developed across the pixel electrode 3 and common electrode 2, and the liquid crystal 10 rotates with twisting in a plane parallel to the surface of the substrate, whereby the display is controlled.

In the present embodiment, as shown in FIG. 8, the color layer 12 is provided separately for each pixel. Further, each color layer 12 is positioned so as not to overlap the gate line 6 nor drain line 5 when seen from the normal direction of the substrate in plan view. In other words, as shown in FIG. 9, the black matrix layer 13 is formed to extend to reach above the common electrode 2 on the drain line 5 side, and the color layer 12 is formed to extend but not to reach the drain line 5. The color layer 12 is preferably formed so as to overlap the black matrix layer 13 at a position spaced apart by a distance of 6 $\mu$m from the drain line 5 in the horizontal direction with respect to the surface of the substrate. Also, as shown in FIG. 10, the black matrix layer 13 is formed so as to cover the gate line 6 and extend to reach a coupled portion of the common electrode 2 on the gate line 6 side, while the color layer 12 is formed to extend but not reach the gate line 6. The color layer 12 is preferably formed so as to overlap the black matrix layer 13 at a position spaced apart by a distance of 6 $\mu$m from the gate line 6 in a horizontal direction with respect to the surface of the substrate.

In this manner, in the present embodiment, the color layer 12 is formed so as not to overlap the gate line 6 nor drain line 5 when seen from the normal direction of the substrate. Hence, if a voltage is applied to the gate line 6 or drain line 5, the charges are hardly injected into the color layer 12 by the applied voltage. Accordingly, it is possible to suppress the development of an unwanted vertical electric field across the color layer 12 and pixel electrode 3, and therefore, disturbance of the orientation of the liquid crystal molecules caused by the vertical electric field will not occur.

Also, in the present embodiment, because the color layers 12 are separated from one another above the gate line 6, the equivalent circuit between the gate line 6 and pixel electrode 3 is, as shown in FIG. 11, the resistance R2 of the color layer 12 and the resistance R3 of the black matrix layer 13 in series. For this reason, the magnitude of this series resistance largely depends on the resistance R2 of the color layer 12 having large resistance. Consequently, different from the conventional liquid crystal display, it never happens that the combined resistance largely depends on the resistance R3 of the black matrix layer 13.

In other words, as shown in FIG. 12, even if the resistance R3 of the black matrix layer 13 drops, the luminance at displaying black does not rise markedly. Hence, a wide margin can be secured for the material selection or the like of the black matrix layer 13. More specifically, according to the present embodiment, even if the specific resistance of the black matrix layer 13 drops to the order of $10^{10}$ to $10^2$ ($\Omega \cdot cm$), the luminance at displaying black stays in the vicinity of 0.5 (cd/cm$^2$). Therefore, according to the present embodiment, the specific resistance of the black matrix layer 13 can be set to a range from the order of $10^2$ to $10^{10}$ ($\Omega \cdot cm$) approximately, thereby making it possible to secure a wide margin for the material selection of the black matrix layer 13.

In the present embodiment, the color layer 12 is formed at a position spaced apart by a distance of approximately 6 $\mu$m, for example, from the gate line 6 and drain line 5 of each pixel in the horizontal direction with respect to the surface of the substrate. It should be appreciated, however, that the present invention is not limited to the above constitution, and the color layer 12 can be formed at any position unsusceptible to a change in voltage on the gate line 6 and drain line 5. For example, because a change in voltage is smaller on the drain line 5 side, the color layer 12 can be formed closer to the drain line 5. Also, the color layer 12 and the drain line 5 may overlap at their respective edges.

In addition, in the present embodiment, the black matrix layer 13 is formed to extend to reach above the common electrode 2 in the vicinity of the drain line 5 in the lateral direction (the extension direction of the gate line 6), and to extend to reach above the coupled portion of the common electrode 2 in the vicinity of the gate line 6 in the longitudinal direction (the extension direction of the drain line 5). However, the black matrix layer 13 only has to be formed up to a region where it overlaps the color layer 12 at the end portion, and is able to block unwanted incident light in a satisfactory manner.

Figure 13:
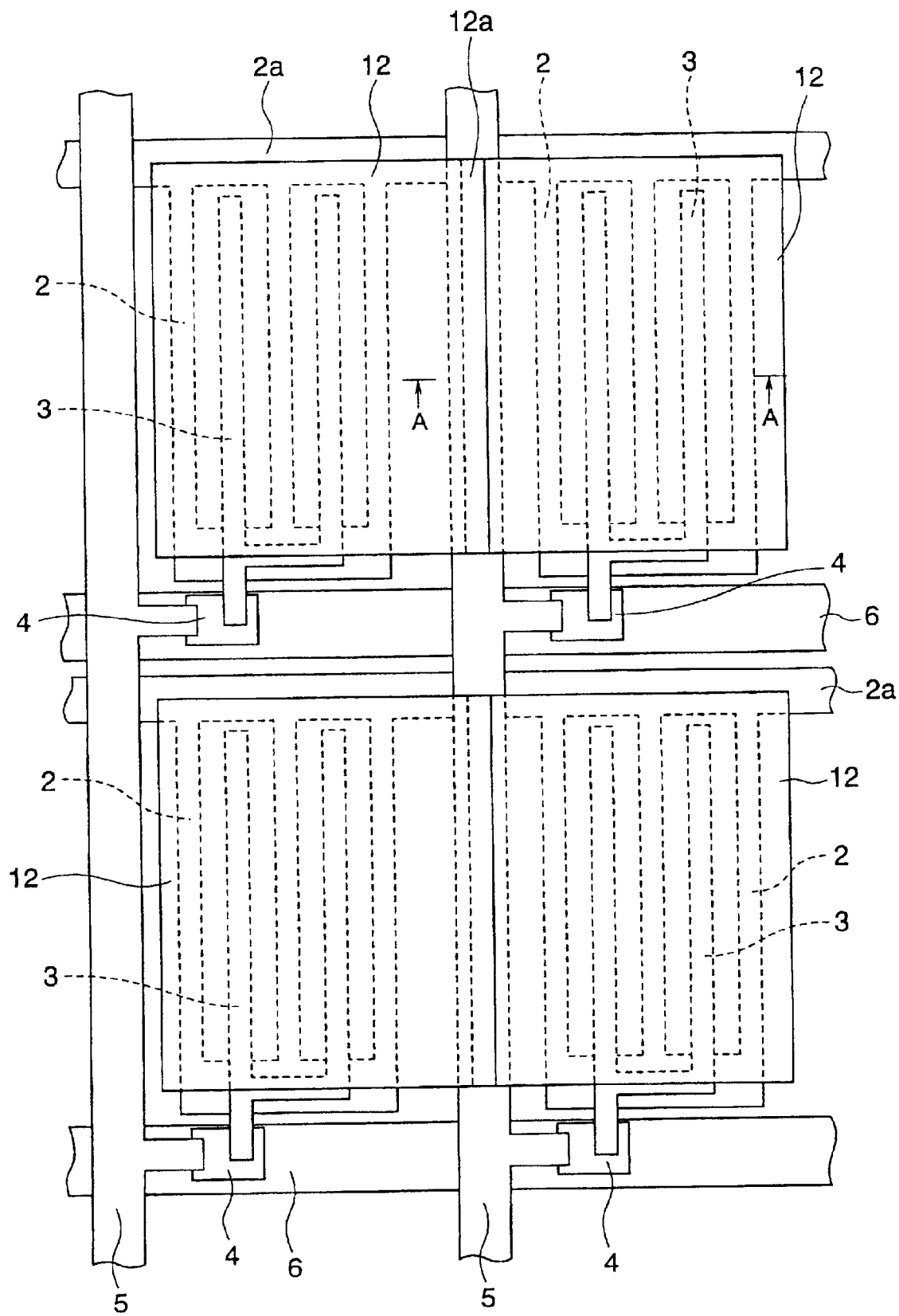
FIG. 13 is a plan view showing a constitution of a liquid crystal display in accordance with a second embodiment of the present invention.
Figure 14:
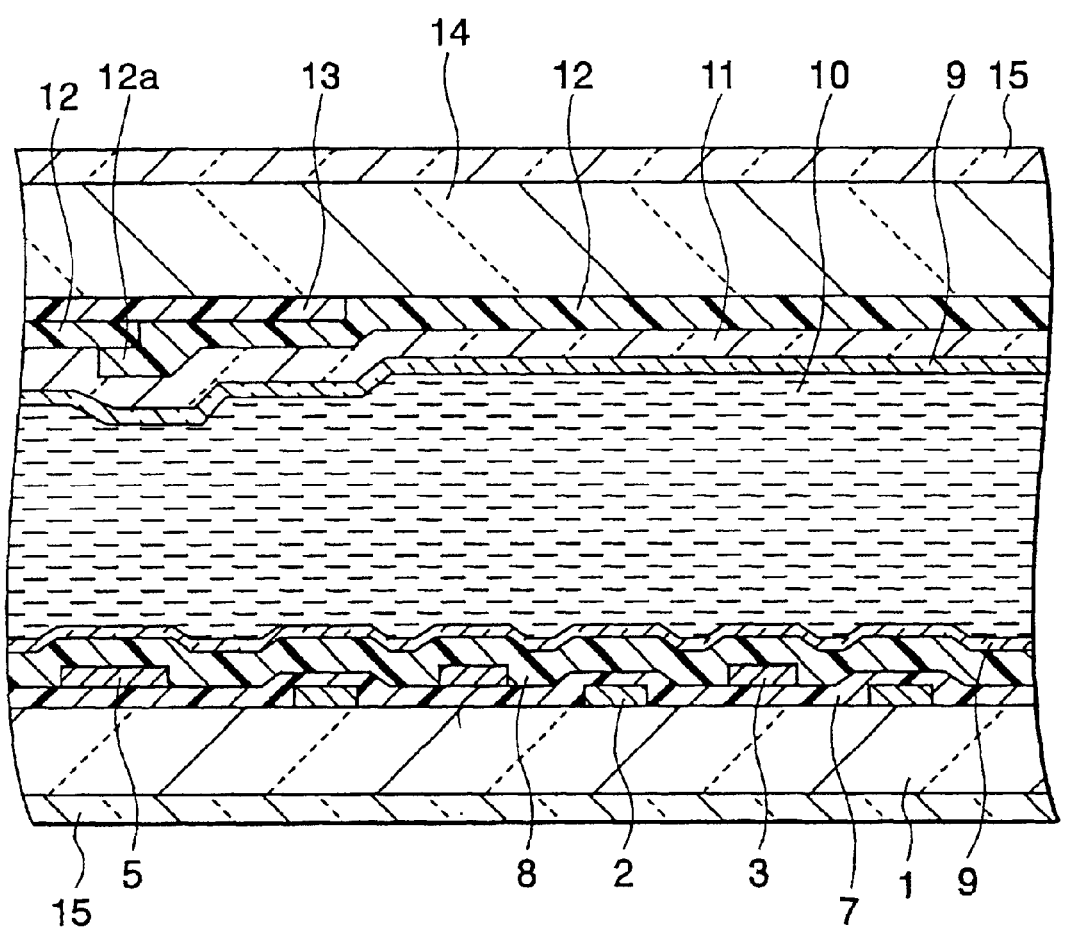
FIG. 14 is a cross section taken along the line A—A of FIG. 13.

Next, the following description will describe a liquid crystal display in accordance with a second embodiment of the present invention with reference to FIGS. 13 and 14. FIG. 13 is a plan view showing a constitution of the liquid crystal display in accordance with the second embodiment of the present invention. In the drawing, the layout of the electrodes and bus lines in the TFT substrate side and the layout of the color layer in the CF substrate side are superimposed. FIG. 14 is a cross section taken along the line A—A of FIG. 13.

In the second embodiment, as shown in FIGS. 13 and 14, as same as the first embodiment, the gate lines 6 and drain lines 5 are formed on the transparent substrate 1 for the TFT substrate 21 so as to intersect substantially at right angles with each other, and a TFT 4 is provided at each intersection. Each pixel is provided with comb-teeth-wise pixel electrode 3 and common electrode 2. The pixel electrode 3 is connected to the TFT 4, and the common electrode 2 is connected to the common electrode line 2a that extends along the gate line 6.

The transparent substrate 14 for the CF substrate 22 is provided with the black matrix layer 13 for blocking unwanted incident light and the color layer 12 for color display, that is, three colors of RGB display. Further, the overcoat layer 11 is formed to cover the color layer 12.

The orientation film 9 is coated over the innermost surface of each of the TFT substrate 21 and CF substrate 22, and the liquid crystal 10 is sandwiched between these substrates. The polarizing plate 15 is laminated to the outside of each substrate, and axes of polarization of the two polarizing plates 15 intersect at right angles with each other. The axis of polarization of one of the two polarizing plates 15 is set so as to be parallel to the orientation direction of the liquid crystal 10. All the common electrodes 2 are applied with a constant common potential. Each pixel electrode 3 is written with a potential from the drain line 5 via their respective TFTs 4. Consequently, a lateral electric field is developed across the pixel electrode 3 and common electrode 2, and the liquid crystal 10 rotates with twisting in a plane parallel to the surface of the substrate, whereby the display is controlled.

In the present embodiment, as shown in FIG. 13, the color layers 12 are provided separately for each pixel and spaced apart from one another in the longitudinal direction in the drawing (the extension direction of the drain line 5). On the other hand, the color layers 12 are provided in such a manner that the color layers 12 for each adjacent pair of pixels overlap in the lateral direction (the extension direction of the gate line 6). In other words, as shown in FIG. 14, the black matrix layer 13 is formed to extend to reach above the common electrode 2 on the drain line 5 side, while each color layer 12 is formed to overlap the adjacent color layer 12 above the drain line 5.

According to a conventional driving method of the liquid crystal display, a voltage of the same polarity is applied to all the liquid crystal corresponding to the pixels to be displayed for one frame. With such a conventional driving method, for example, it is necessary to apply a voltage of positive polarity in the odd-numbered frames and a voltage of negative polarity in the even-numbered frames. Hence, an alternating voltage that changes in a cycle double the frame is applied in-phase to the liquid crystal for all the pixels. Because the frequency of the alternating voltage applied to the liquid crystal is reduced to the half, if the driving frequency is lowered, flickers become noticeable across the liquid crystal display screen, thereby posing a problem that the display quality is deteriorated.

In order to solve this problem, Japanese Patent Laid-Open Publication No. Hei. 5-249436 discloses a driving method, by which the polarity of an applied voltage to the liquid crystal is inverted between the odd-numbered drain lines and even-numbered drain lines, while at the same time, an applied voltage to the liquid crystal is inverted between the odd-numbered gate lines and even-numbered gate lines. This is a so-called dot inversion (pixel inversion) driving method. According to the driving method disclosed in this publication, all the display pixels at above, below, right, and left with respect to one particular display pixel are applied with a voltage in the opposite phase to a voltage applied to that particular display pixel. Therefore, a relation in terms of voltage among each adjacent pair of display pixels is all the same across the display screen. Also, the same driving is carried out frame by frame. As a result, the applied voltage is averaged for all the display pixels, thereby suppressing the flickers markedly.

The second embodiment includes a structure suitable to such a driving method by dot inversion (pixel inversion). In the present embodiment, because the color layer 12 is formed above the drain line 5, the charges may be injected into the color layer 12 by a voltage applied to the drain line 5. On the other hand, by applying the voltages of opposite polarities to the odd-numbered drain lines 5 and even-numbered drain lines 5, respectively, while applying the voltages of opposite polarities to the odd-numbered gate lines 6 and even-numbered gate lines 6, respectively, charges of opposite polarities are injected into each adjacent pair of the color layers 12, respectively. In the present embodiment, because the color layers 12 are formed so that each adjacent pair of the color layers 12 overlap at their respective end portions, the color layers 12 respectively injected with the charges of opposite polarities are connected to each other, and therefore, the charges injected to the adjacent color layers 12 are cancelled out at the end portions. As a result, it is possible to suppress the charging of the color layers 12 for all the pixels.

In order to adapt the driving method discussed above, for example, one only has to provide a driving circuit capable of driving the liquid crystal by applying signal voltages of opposite polarities to the odd-numbered drain lines 5 and even-numbered drain lines 5, respectively, while inverting the polarities of the gate lines 6 per scanning cycle. Known driving circuits can be used as such a driving circuit.

In this manner, in the present embodiment, like in the first embodiment, the color layer 12 is formed so as not to overlap the gate line 6 when seen from the normal direction of the substrate. Thus, even when a voltage is applied to the gate line 6, the charges are hardly injected into the color layer 12 by the applied voltage. Also, the equivalent circuit between the gate line 6 and pixel electrode 3 is the resistance R2 of the color layer 12 and the resistance R3 of the black matrix layer 13 in series. Hence, a wide margin can be secured for the material selection or the like of the black matrix layer 13.

Also, the color layers 12 are formed in such a manner that each adjacent pair of the color layers 12 overlap at their respective end portions. Thus, in case of adapting the driving method such that anti-phase voltages are applied to the odd-numbered drain lines and even-numbered drain lines, respectively, while anti-phase voltages are applied to the odd-numbered gate lines and even-numbered gate lines, respectively, even if the charges are injected into the color layers 12, the injected charges are cancelled out within the adjacent pair of the color layers 12. Consequently, the charging of all the color layers 12 can be prevented, and hence, there will be developed no unwanted electric field across the color layer 12 and pixel electrode 3 such that disturbs the orientation of the liquid crystal molecules.

In the present embodiment, the color layer 12 is formed in the inner side at a predetermined distance from the gate line 6 for each pixel. It should be appreciated, however, that the present invention is not limited to this constitution, and the color layer 12 only has to be formed within a region unsusceptible to a change in voltage on the gate line 6. In addition, in the present embodiment, the color layers 12 aligned in the extension direction of the gate lines 6 are independent, and overlap above the drain lines 5. It should be appreciated, however, that the similar effect can be attained even if the color layers 12 are provided as a serially connected one body in the extension direction of the gate lines 6.

What is claimed is:

1. A liquid crystal display, comprising:
    a first substrate, said first substrate including:
        a transparent substrate;
        a plurality of gate lines and a plurality of drain lines formed on said transparent substrate;
        thin film transistors, each of said thin film transistors being provided in a vicinity of the intersection of said gate line and drain line;
        pixel electrodes, each of said pixel electrodes being formed within a pixel region enclosed with an adjacent pair of said gate lines and an adjacent pair of said drain lines, and connected to said thin film transistor; and
        common electrodes, each of said common electrodes developing an electric field within each of said pixel regions between said pixel electrode and itself;
    a second substrate opposing to said first substrate, said second substrate including:
        color layers provided for each of said pixel regions, said color layers being spaced apart from said gate lines and drain lines when seen in plan view, and
        a black matrix layer, said black matrix layer overlapping said gate lines and said drain lines when seen in plan view, said black matrix layer and said drain lines constituting direct capacitive coupling free from any electrode therebetween, and said black matrix layer and said gate lines constituting direct capacitive coupling free from any electrode therebetween; and
    liquid crystal provided in a space between said first substrate and second substrate,
    wherein the resistance value of the black matrix is greater than $1\times10^2$ and less than $1\times10^5 \Omega$ cm.

2. The liquid crystal display according to claim 1, further comprising a driving circuit which applies signal voltages of opposite polarities to each adjacent pair of pixels, respectively, while inverting polarities of said gate lines per scanning cycle.

3. The liquid crystal display according to claim 1, wherein each of said pixel electrodes and common electrodes is of a comb-teeth-wise shape.

4. The liquid crystal display according to claim 2, wherein each of said pixel electrodes and common electrodes is of a comb-teeth--wise shape.

5. Liquid crystal display as claimed in claim 1, wherein the resistance value of the black matrix is greater than $1\times10^2$ and less than or equal to $1\times10^4 \Omega$ cm.

* * * * *